US 6,540,165 B1

(12) United States Patent
Hussein et al.

(10) Patent No.: US 6,540,165 B1
(45) Date of Patent: *Apr. 1, 2003

(54) PROCESS FOR HANDLING PARTICULATE MATERIAL AT ELEVATED PRESSURE

(75) Inventors: Fathi David Hussein, Cross Lanes; Ronald Steven Eisinger, Charleston; Daniel Paul Zilker, Jr., Chaarleston; David Mason Gaines, St. Albans, all of WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,746

(22) Filed: Sep. 24, 1999

(51) Int. Cl.⁷ .............................. B02C 1/00; B02C 11/08
(52) U.S. Cl. .............................. 241/18; 241/41; 241/47; 526/88
(58) Field of Search ................ 241/18, 41, 42, 241/47, 57, 62; 526/88

(56) References Cited

U.S. PATENT DOCUMENTS

| 4,466,809 A | 8/1984 | Kissel et al. ............... 48/197 |
| 4,699,210 A | 10/1987 | Brannstrom ............... 165/120 |
| 4,834,902 A | 5/1989 | Pioch et al. ............... 252/135 |
| 5,071,289 A | 12/1991 | Spivak ............... 406/11 |
| 5,421,524 A | * 6/1995 | Haddow ............... 241/18 |
| 5,763,541 A | 6/1998 | Wang et al. ............... 526/88 |
| 5,921,479 A | * 7/1999 | Doenges et al. ............... 241/18 |
| 6,077,920 A | * 6/2000 | Wang et al. ............... 526/88 |

OTHER PUBLICATIONS

Abstract—JP 1018455—Jan. 23, 1989—Show a Denko KK.
Abstract—DE 3734760—May 3, 1989—Bleckmann, H.

* cited by examiner

Primary Examiner—Ed Tolan

(57) ABSTRACT

A process comprising the steps of: (1) pressurizing a particulate material in bead or pellet form in a vessel to an elevated pressure with a first gas, (2) reducing the particulate material under the elevated pressure to a fine consistency, (3) conveying the fine consistency particulate material into a receiving vessel.

18 Claims, 3 Drawing Sheets

Carbon Black Feeding-Pilot-scale

Carbon Black Feeding-Pilot-scale

Carbon Feed System Pilot-scale

PROCESS FOR HANDLING PARTICULATE MATERIAL AT ELEVATED PRESSURE

FIELD OF THE INVENTION

The present invention relates to a process for handling particulate materials at elevated pressure. More particularly, the present invention relates to a process for handling inert particulate material such as carbon black at elevated pressure such as in a gas-phase, fluidized-bed polymerization (e.g., of an ethylene-propylene or ethylene-propylene-diene rubber, polybutadiene, or polyisoprene).

BACKGROUND OF THE INVENTION

Recently, the production of sticky polymers such as, for example, ethylene-propylene-diene rubbers has been conducted in a gas phase polymerization process. These processes typically employ an inert particulate material which forms a coating on the sticky polymer; serves to maintain the bed of forming polymer in a fluidized state; and prevents agglomeration.

Commercially, inert particulate materials are available in the form of beads or pellets which are too large to adequately coat and maintain the forming polymer in a fluidized state. Therefore, in order for these inert particulate materials to perform effectively, they have to be reduced to a smaller particle size before being fed to the gas-phase, fluidized-bed reactor. This small particle size material, such as carbon black fluff, is difficult to feed in a controlled manner because it has a tendency to pack and/or bridge. In particular, carbon black fluff sets up into a hardened mass when it is pressurized with gas to elevated pressures. This elevated pressure may typically be about 25 psig. Physical agitation of the packed inert particulate material such as carbon black fluff is impractical for use with a commercial-size polymerization reactor.

Accordingly, there is a need for a method of feeding small particles of particulate material such as, for example, inert particulate material, especially carbon black fluff, to a gas-phase, fluidized-bed polymerization under elevated pressure in a controllable manner.

SUMMARY OF THE INVENTION

The present invention provides a process comprising the steps of: (1) pressurizing a particulate material in bead or pellet form in at least one vessel to an elevated pressure with a first gas, (2) reducing the particulate material to a fine consistency under the elevated pressure, (3) conveying the fine consistency particulate material into a receiving vessel.

In a preferred embodiment the invention is a process comprising the steps of: (1) pressurizing a particulate material in bead or pellet form in a vessel to an elevated pressure with a first gas, (2) conveying the particulate material under elevated pressure into a polymerization reaction system in a manner that mechanically breaks the beads or pellets to a fine consistency, and, optionally (3) employing a second gas to convey said fine-consistency particulate material into the reaction zone of the polymerization system.

In another preferred embodiment, there is provided an improved process comprising the steps of (1) conveying the particulate material in bead or pellet form in at least one vessel at low pressure to one or more small ("shot") pressure vessels where it is pressurized to an elevated pressure with an inert gas or monomer, (2) conveying particulate material under said elevated pressure into a polymerization reactor under conditions of sufficient shear between the beads or pellets and the wall of the conveying device such that the beads or pellets are reduced to a fine consistency or "fluff".

In still a further embodiment there is provided in a process for the polymerization of at least one olefinic monomer in the presence of a catalyst under polymerization conditions in the presence of a particulate material, the improvement which comprises the steps of: (1) pressurizing said particulate material in bead or pellet form in at least one vessel to an elevated pressure with a first gas, (2) conveying the particulate material under said elevated pressure into a grinding device, (3) grinding the particulate material to a fine consistency at said elevated pressure, (4) passing a second gas through said grinding device and thereby conveying said fine-consistency particulate material into a polymerization reactor.

DETAILED DESCRIPTION OF THE INVENTION

Figure 1:
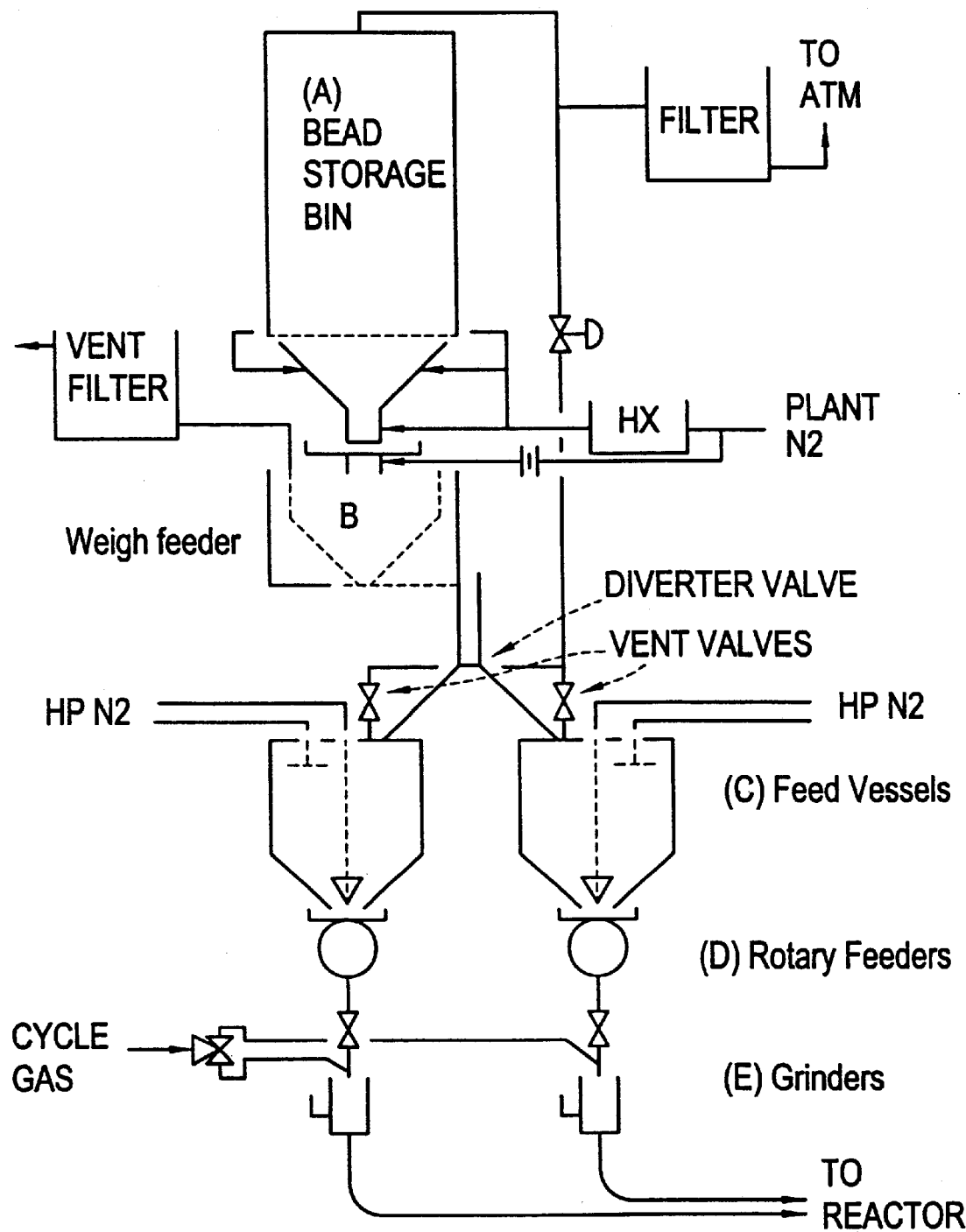
FIG. 1 is an inert particulate material feed system (using, for example, carbon black) for a pilot-scale unit as in Example 1.

Any particulate material can be subjected to the process of pressuring and reducing to a fine consistency particulate material in accordance with the invention. Such particulate materials can include, for example, inert particulate materials (also referred to as fluidization aids), known catalyst supports or carriers, solid additives, and other similar materials. For purposes of ease of description, the invention is described for use with inert particulate materials.

In a preferred process of the invention, it is desirable to employ an inert particulate material or fluidization aid. Preferably the particulate material is an inert particulate material. Gas phase processes utilizing inert particulate materials are disclosed, for example, in U.S. Pat. Nos. 4,994,534; 5,304,588; and 5,317,036; EP 0 727,447 and WO 98/34960. Such inert particulate materials can include carbon black, silica, clay, talc, calcium carbonate, activated carbon, modified carbon black, and mixtures thereof. Polymeric materials can also be employed. Carbon black, silica, and mixtures of them are preferred. Generally, carbon black, especially carbon black bead or fluff, is the most preferred.

Commercially available inert particulate materials in granular form (e.g., beads or pellets) have an average bulk density ranging from about 20 to 25 lb/ft$^3$. Other characteristics of such materials can include, for example, an average particle size of about 0.02 to 0.05 inches, and a pellet or bead crush strength of about 5 to 60 grams. When the beads or pellets have been subjected to process of this invention, the inert particulate material has an average bulk density of 3 to 8 lb/ft$^3$ and less than 0.009 inches average particle size, as measured with screening sieves.

Prior to entry into the reactor or vessel of step (1) such as a receiving vessel, the inert particulate material is preferably treated to remove traces of moisture and oxygen. This purification step is preferably accomplished, for example, in one or more drying bins (preferably one bin) by passing hot nitrogen (50 to 200 degrees C) through the inert particulate material. Preferably, the inert particulate material is dried at or about atmospheric pressure before it is subjected to grinding. It is preferred to treat the beaded or pelleted inert particulate material in this manner rather than the fine consistency (or powdery ground form) inert particulate material which has the tendency to pack under pressure, which packing can lead to vessel and line plugging.

The first or second gases can be the same or different and these gases can be employed for both drying and conveying the inert particulate material. The gas or gases employed for these purpose in the process of the invention can be any gas that is inert to the polymerization system. Such gases can include nitrogen, argon, a gaseous hydrocarbon such as an alkane having 1 to 12 carbon atoms, the cycle gas of the polymerization itself, and mixtures of these gases. Cycle gas is the gas containing monomer(s), catalyst components, modifiers, and inert gas(es) which is circulated through the polymerization vessel. Monomers can also be used for drying and conveying in some circumstances. Preferably the gas is selected from the group consisting of nitrogen, methane, ethane, ethylene, propane, propylene, isopentane, butane, hexane, cycle gas, and mixtures thereof. Preferably nitrogen is used as the gas to dry the inert particulate material.

In an especially preferred embodiment, cycle gas and/or nitrogen is employed as the conveying gas. When cycle gas is used as the conveying gas, it is routed via a slip stream from the polymerization system. Preferably the slip stream is taken from the recycle lines of the polymerization system. A slip stream of the polymerization process cycle gas is the preferred medium, since it is available in high quantities enabling a higher conveying velocity of 20 to 100 feet per second, preferably 40 to 70 feet per second, and does not introduce additional inert gases to the reaction and/or cycle stream.

Next, the inert particulate material enters at least one vessel in step (1) such as a high-pressure feeder (also referred to as a high-pressure hopper or feed vessel). In a preferred embodiment, the inert particulate material enters one of two high-pressure feeders. When two (or more) feeders are employed side-by-side, the feeders are maintained at a pressure that is slightly above the conveying line pressure of about 0.1 to 10 psig by means of the one of the inert gases listed above or by means of a monomer that is employed in the polymerization. The pressure inside a vessel of step (1) is typically no more than 5 psig above the pressure in the conveying line. In general, the feed vessel pressure ranges from about 20 to 1000 psig, preferably from about 200 to 550 psig. In one preferred embodiment, the feeders are cone-shaped (inverted as in a funnel) having a cone angle of 60 to 78 degrees with respect to horizontal and a discharge opening diameter of at least three inches. Preferably an aeration flow of gas is maintained into the bottom of the feeders containing a bed of inert particulate material beads and/or pellets. The flow rate of this aeration gas depends on feeding equipment and size. For example, this flow in a pilot plant scale equipment is about 10 pounds per hour.

In this invention the feeders are connected in series or in parallel. Preferably the feeders are employed in series. When the feeders are employed in series, the first or higher feeding hopper is cycled between low and high pressure ranging from near atmospheric pressure to the desired elevated pressure (in order to charge fresh batches of beads or pellets). The second or lower feeding vessel remains at high pressure in order to continuously feed the inert particulate material in bead or pellet form to a grinding device. Generally, the pressure in this second or lower vessel is about the same as that used in the polymerization reactor and ranges from about 20 to 1000 psig, preferably about 200 to 550 psig. In parallel operation, the feeding vessel must be de-pressurized before being filled with inert particulate material, then re-pressurized to the desired pressure. The inert particulate material is then conveyed (via gravity, gas, or other means) to a grinding device where it is ground and from there enters the polymerization reactor.

The beads or pellets of inert particulate material are preferably metered from at least one of the feeding vessels into one or more grinding devices using one or more high pressure rotary valves designed for use with the one or more high pressure grinding devices of the invention. Such high pressure rotary valves can be obtained by special order from YOUNG INDUSTRIES, Inc. (Muncy, Pa.).

From the rotary valves, the inert particulate material enters one or more grinding devices designed for high pressure grinding (up to 600 psig). Grinding can be accomplished by a variety of technologies, including, but not limited to, hammer mills and pin mills. The grinder utilized in the invention is custom-designed by Union Carbide Corporation (South Charleston, W. Va.) and is capable of operating continuously under high pressures, 25 psig to 600 psig. In the present invention, it is preferred to use at least two grinding vessels, and to use only one grinder at a time. Gas, preferably cycle gas, is used to convey the inert particulate material through a grinder as in step (4) of the process.

After the inert particulate material is subjected to the high-pressure grinding step (3) of the invention, a fine-consistency, or powdery substance is produced. In the case of carbon black, it is referred to as "fluff". The fine-consistency inert particulate material is preferably 100 microns or less, has a bulk density ranging from 3 to 8 lb/ft$^3$, and has a particle size of less than 0.02 cm as measured with screening sieves. The reduced particle size maximizes the surface area of the sticky polymer that can be coated for a given amount of inert particulate material such as carbon black fluff. This ground inert particulate material is conveyed to the polymerization reactor using the cycle gas at a velocity of 20 to 100 feet per second, preferably 40 to 70 feet per second under pressure ranging from about 200 to 600 psig.

The polymerization can be carried out in a single reactor or multiple reactors. Two or more in series can also be employed. Preferably a single reactor is employed. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, conventional, condensed (including induced), and liquid mode processes of polymerizing can be carried out in a gas-phase fluidized bed initially containing a "seed bed" of polymer which is the same or different from the polymer being produced. Preferably, the bed is made up of the same granular resin that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, butane, isopentane, and mixtures thereof) and, if desired, modifiers (e.g., hydrogen). Thus, during the course of a polymerization, the bed comprises formed polymer particles, growing polymer particles, catalyst particles, and optional flow aids (fluidization aids) fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 20 to 100° C., and most preferably about 30 to 80° C. Partial pressure of each monomer will vary depending upon the particular monomer or monomers employed and the temperature of the polymerization, and it can range from about 0.0001 to 300 psi (0.000689 to 2,006 kiloPascals), preferably 1 to 100 psi (6.89 to 689 kiloPascals).

Dienes when employed in the production of EPR can include: conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 1,7-octadiene, 7-methyl-1,6-octadiene (MOD), vinylcyclohexene, dicyclopentadiene, butadiene, isoprene, ethylidene norbornene (ENB), and the like. Most preferred are: ENB, MOD, 1,5-hexadiene, and dicyclopentadiene. Isoprene is employed to produce polyisoprene; and, likewise, butadiene (e.g., 1,3-butadiene) is used to produce polybutadiene (high cis-1,4-polybutadiene).

The catalyst employed in the polymerization can contain a precursor, aluminum alkyl cocatalyst and promoter (optional). It can be supported (on an inert carrier material such as carbon black, silica, magnesia, alumina, and/or activated carbon) or unsupported (as a liquid or in a slurry, solution, or emulsion). The catalyst can be in the form of a prepolymer or sprayed dried (with or without a filler material). Typical catalysts precursors can, for example, include compounds employing a metallocene (e.g., containing a metal selected from the group consisting of titanium, hafnium, zirconium, and mixtures thereof) and/or compounds employing a transition or rare earth metal (e.g., containing a metal selected from the group consisting of nickel, cobalt, titanium, vanadium, neodymium, and mixtures thereof).

When a catalyst support is employed, it can be impregnated with one or more of the individual catalyst components (precursor, cocatalyst, promoter). Generally, the catalyst precursor is impregnated and the other components are introduced separately into the polymerization. If used, the support can be silica, alumina, carbon black, activated carbon, or polymeric material with silica being the most preferred. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns, preferably about 30 to 100 microns; a surface area of at least 200 square meters per gram, preferably at least about 250 square meters per gram; and a pore size of at least about 100 Angstroms, preferably at least about 200 Angstroms. Impregnation of the catalyst precursor or other component of the catalyst system onto a support such as silica is well known and can be accomplished, for example, by mixing the precursor and silica gel in an inert solvent followed by solvent removal under reduced pressure.

Examples of polymers that can be produced using the method of the invention include ethylene-propylene rubbers; ethylene-propylene-diene rubbers; polybutadiene rubbers; polyisoprenes; high-ethylene-content propylene-ethylene block copolymers; poly(1-butene) (when produced under certain reaction conditions); polypropylenes; polyethylenes; very low density (low modulus) polyethylenes, i.e., ethylene butene rubbers or hexene containing terpolymers; especially ethylene-propylene-ethylidenenorbornene terpolymer, ethylene-propylene-hexadiene terpolymer, and ethylene-propylene-octadiene terpolymer. The olefinic monomers used to produce them can be employed in the polymerization as well as other $C_1$ to $C_{24}$ olefins.

All references are incorporated herein by reference.

Whereas the scope of the invention is set forth in the appended claims, the following examples illustrate certain aspects of the present invention. The examples are set forth for illustration and are not necessarily to be construed as limitations on the invention, except as set forth in the claims. Throughout the specifications all parts and percentages are by weight unless otherwise stated.

EXAMPLES

Example 1

Pilot Plant Operation with a Grinder

A system such as that depicted in FIG. 1 was designed to feed carbon black into the reactor. It consisted of a large bead storage bin where the carbon black beads were dried, a weigh feeder, two pressurizable bead feed vessels followed by twin grinders.

Carbon black beads in 1000-pound-capacity supersacks were charged to a storage bin (A), where they were dried at near atmospheric pressure using hot nitrogen. The beads were heated and purged at temperatures ranging from 50 to 150° C. to remove moisture and oxygen. Dried carbon black beads were periodically discharged by gravity to a weigh feeder (B). The weigh feeder charged a pre-weighed batch of carbon beads to one of the high-pressure feed vessels (C). When the level in the weigh feeder dropped to a preset level, more carbon beads were discharged from the storage bin to fill the weigh feeder.

The carbon black beads discharged from the weigh feeder to one of the feed vessels were then pressurized with inert gas such as nitrogen to a pressure slightly higher than the polymerization reactor pressure by an amount in the range of 0.1 to 5 psi. The feed vessel operating pressure ranged from 200 to 600 psig, and preferably from 350 to 550 psig, and most preferably 375 to 425. Carbon black was fed from the pressurized feed vessel to the polymerization reactor through a rotary feeder (D) connected to a bead grinder (E). The cycle was automated by interfacing all equipment and controls to a Process Logic Controller. Controlled and smooth pressurization of the carbon black in the feed vessel to prevent carbon black packing in the vessel was achieved by feeding nitrogen under pressure via a pressurization valve into a diffuser tube located above the bed of the carbon beads. Two additional nitrogen flows were employed. One nitrogen flow was added through an aeration cone near the bottom of the feed vessel and another nitrogen flow was added below the rotary feeder. The carbon black feed rate to the reactor was metered using the rotary feeder speed.

Each grinding device was installed after one of the rotary feeders located beneath each of the carbon black feed vessels. These grinders were used to break the carbon black beads into fluff for use as a fluidization aid in the reactor. The grinding device was a high speed, pressurized hammer mill that utilized a Stellete®-coated six-arm hammer rotating at high rpm (about 9000 rpm) to ground the carbon beads to fluff. The ground carbon black was conveyed from the grinders to the reactor through a 0.02 inch-screen using cycle gas. A circulating, cooled seal oil was provided to lubricate the seals in the grinder to prolong seal life for operation at high speed.

Example 2

Pilot Plant Operation Feeding Inert Particulate Material

Figure 2:
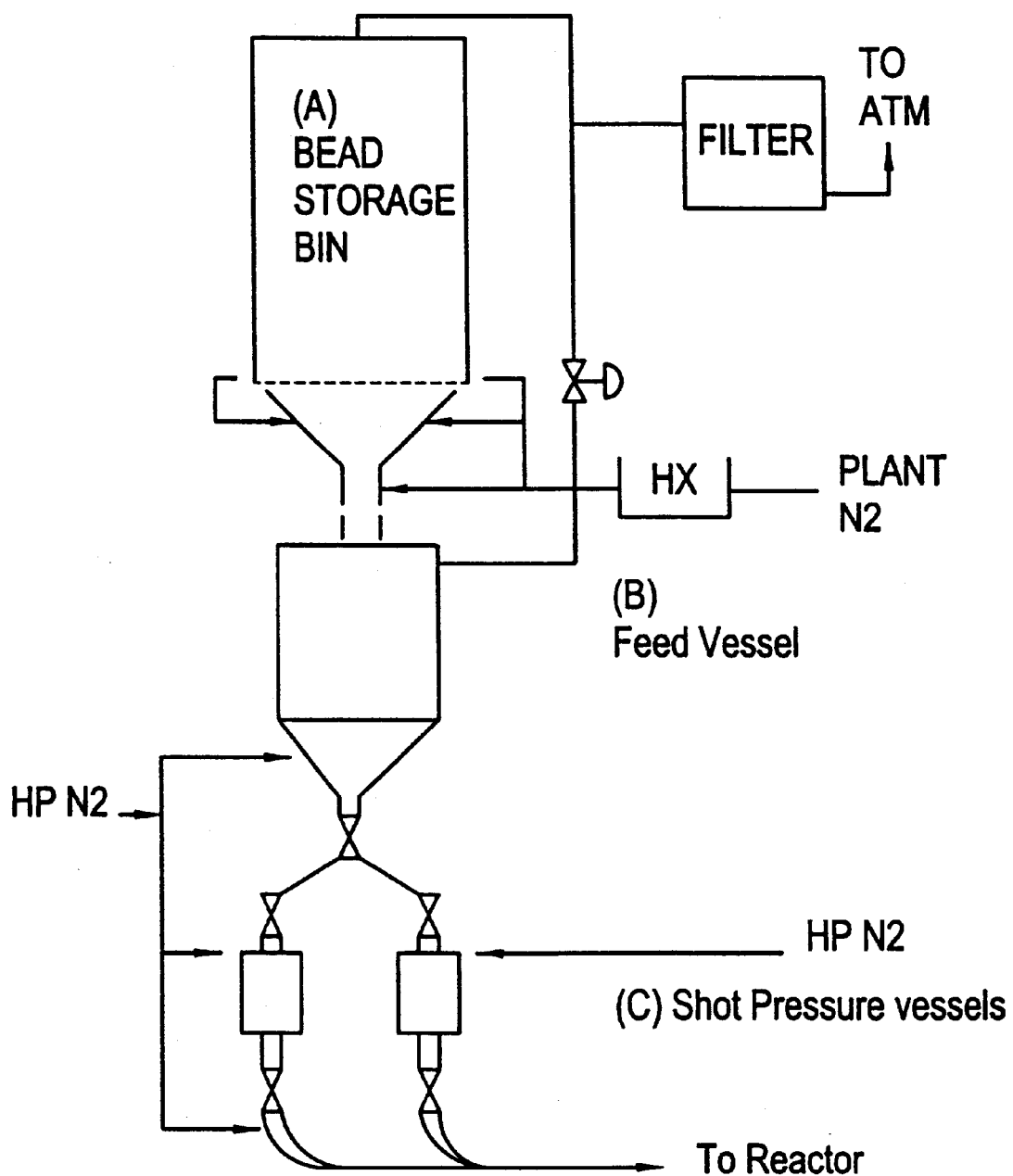
FIG. 2 is an inert particulate material feed system (using, for example, carbon black) for a pilot-scale unit as in Example 2.

A system such as that depicted in FIG. 2 was designed to feed carbon black into a reactor. Carbon black was charged to a large bead storage bin (A) where the carbon black beads were dried at or near atmospheric pressure using hot nitrogen under conditions similar to those set forth in Example 1. The carbon black beads were gravity-fed to the carbon feed vessel (B) by opening an actuated valve on the bottom of the drying vessel (A). Transfer of the beads from vessel (A) to vessel (B) is controlled by low and high point level sensors in the feed vessel (B). The level of carbon black beads in the drying and feed vessels is monitored continuously by capacitance probes. The carbon black feed bead feed vessel (B) was heated to approximately 200° C. with steam fed into steam pads located on the vessel. A nitrogen purge flow was provided by two distributor cones located at the bottom of the tank. Carbon black beads were gravity fed into either of two small ("shot") pressure vessels (C). One of the small vessels (C) filled with carbon black beads was then pressurized to approximately 75 psig above polymerization reactor pressure which was similar to that in Example 1. Inert gas (nitrogen and/or cycle gas) was used as the assist gas to convey the carbon black from the small pressure vessel to the reactor. Carbon black was carried out via either "shot" pressure vessel on a frequency determined by the desired carbon level in the polymerization reactor. The feeding of carbon black into the polymerization reactor was monitored by the pressure difference in the conveying tubing between carbon "shot" pressurized vessel and the reactor. A slight pressure difference was evident in the conveying tubing when carbon black was traveling through it compared to when no carbon was traveling through it.

The pressurization and transfer of carbon black beads resulted in the breaking up of these beads into a fine consistency powder suitable as a fluidization aid.

Both small "shot" pressure vessels (C) were identical in construction. They were constructed of 304 stainless steel with a conical bottom to facilitate the flow of the carbon black beads.

Example 3

Commercial Operation

Figure 3:
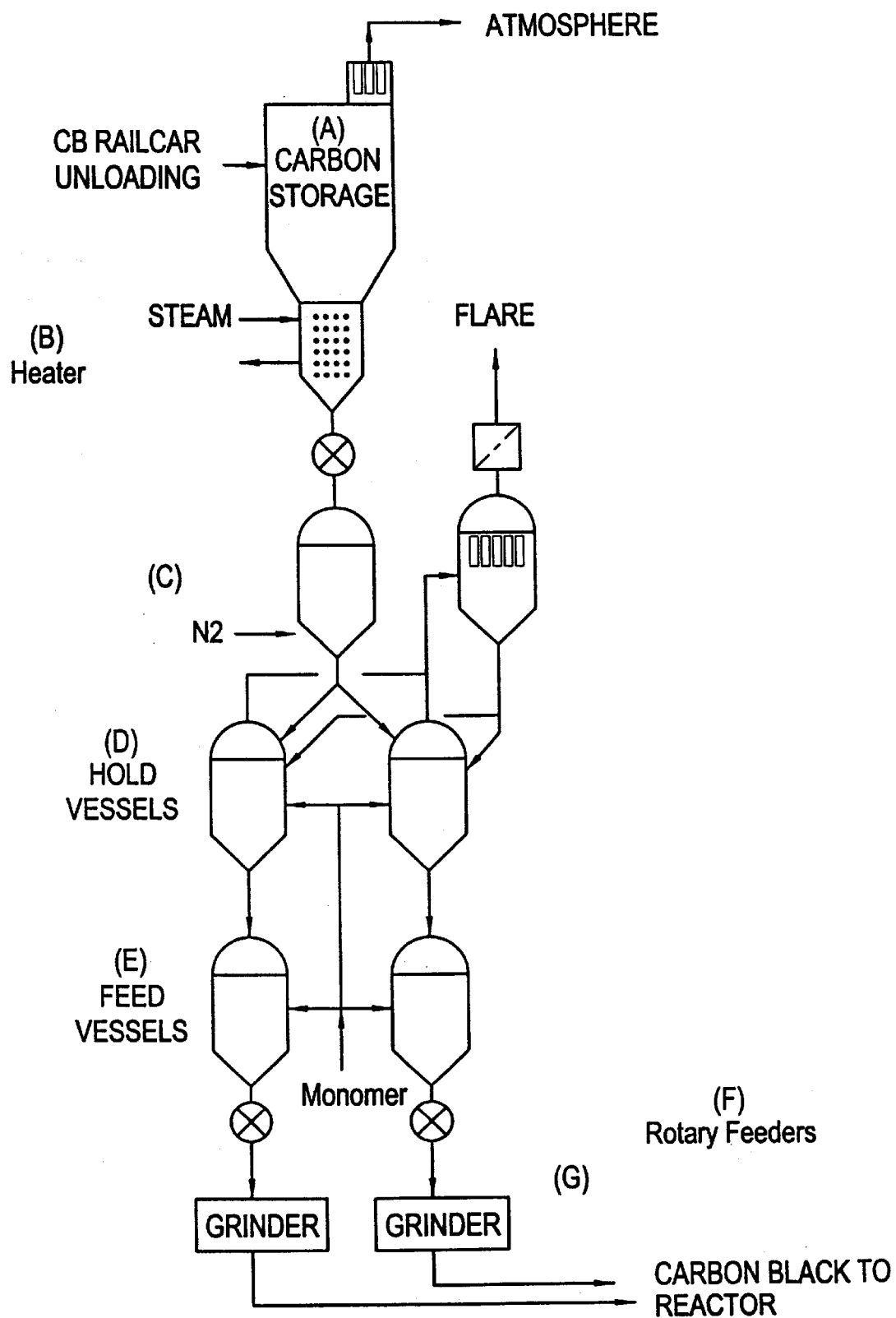
FIG. 3 is a depiction of an inert particulate material feed system such as that employed for carbon black feeding in a large commercial size unit as in Example 3.

As depicted in FIG. 3, carbon black (N-650) was received in railroad cars and conveyed to storage bin (A). The carbon black was gravity fed from storage bin (A) through a fluidization aid heater (B) where it was heated to its drying temperature of greater than 100° C. The heat exchanger was a plate and frame type with steam passing through the plates and carbon black passing between the plates. At the bottom of the heater, nitrogen at a drying temperature of greater than 100° C. was injected to sweep moisture from the interstitial spaces. Heated carbon black flowed from the exchanger into the fluidization aid purge bin (C). Hot nitrogen was used to sweep moisture and oxygen from the carbon black. The nitrogen flowed from the fluidization aid purge bin and then to the fluidization heater.

The fluidization aid purge bin provided residence time to complete purging of water and oxygen from the interstitial spaces between the carbon beads. A gas distributor located in the bottom of the purge bin evenly distributed the nitrogen. The purge bin was sized such that a minimum purge time of thirty minutes was provided. The purged carbon black was gravity-fed into one of the two holding vessels (D).

Beginning with the holding vessels, there were two carbon black feeding systems. One system was in service while the other system was an installed spare. The components of each system included a holding vessel (D), a feed vessel (E), a rotary feeder (F), and a grinder (G). Carbon black beads were transferred from the purge bin to one of the holding vessels under low pressure (slightly above atmospheric, about 0.1 to 5 psig). The carbon black was then gravity fed to the feed vessel after bringing the holding vessel pressure to that of the feed vessel. The feed vessel was constantly at high pressure and ranged between 350 to 600 psig, generally between 475 and 525 psig, to facilitate carbon black feeding to the reactor. Carbon black was fed from the feed vessel to a grinder through a rotary valve continuously. In the grinder, the carbon black beads were ground and dilute phase-conveyed into the reactor using cycle gas as the carrier gas. The grinders used a high-pressure oil seal system to isolate the process from the environment. Pressure on this system was maintained using high pressure nitrogen, which was vented constantly from the seal oil system to a flare.

What is claimed is:

1. A process comprising the steps of: (1) pressurizing a particulate material in bead or pellet form in at least one vessel to an elevated pressure with a first gas, (2) grinding the particulate material to a fine consistency at said elevated pressure, and (3) pneumatically conveying said fine-consistency particulate material under pressure into a polymerization reactor.

2. The process of claim 1 wherein step (2) comprises (i) conveying the particulate material under the elevated pressure into a grinding device, (ii) grinding the particulate material to a fine consistency at said elevated pressure, and (iii) passing a second gas through said grinding devices and then conveying said fine-consistency particulate material into the polymerization reactor.

3. The process of claim 1 wherein in step (1) said first gas is applied above a bed of particulate material.

4. The process of claim 2 wherein the vessel of step (1) has a cone angle of 60 to 78 degrees and a discharge opening diameter of at least three inches.

5. The process of claim 1 wherein an aeration flow of gas is maintained into the bottom of the vessel of step (1).

6. The process of claim 1 wherein the elevated pressure ranges from 25 to about 600 psig.

7. The process of claim 2 wherein the second gas used in step (iii) is selected from the group consisting of an inert gas, a monomer, a cycle gas, and mixtures thereof.

8. The process of claim 2 wherein the particulate material is dried prior to grinding.

9. The process of claim 2 wherein the particulate material is metered through the grinding device and into the polymerization reactor using a rotary feeder operated at said elevated pressure.

10. The process of claim 1 wherein the inert particulate material is employed in the production of a polymer selected from the group consisting of an ethylene-propylene rubber; an ethylene-propylene-diene rubber; polybutadiene; polyisoprene; a high-ethylene-content propylene-ethylene block copolymer; a poly(1-butene) (when produced under certain reaction conditions); polypropylene; polyethylene; and very low density (low modulus) polyethylene.

11. In a process for the polymerization of at least one olefinic monomer in the presence of a catalyst under polymerization conditions in the presence of a particulate material, the improvement which comprises the steps of (1) pressurizing said particulate material in bead or pellet form in a vessel to an elevated pressure with a first gas, (2) conveying the particulate material under said elevated pressure into a hammer or pin mill, (3) milling the particulate material to a fine consistency at said elevated pressure, (4) passing a second gas through said milling and thereby conveying said fine-consistency particulate material into a polymerization reactor.

12. The process of claim 11 wherein in step (1) said first gas is applied above the bed of particulate material.

13. The process of claim 11 wherein the vessel of step (1) has a cone angle of 60 to 78 degrees and a discharge opening diameter of at least three inches.

14. The process of claim 11 wherein an aeration flow of gas is maintained into the bottom of said vessel of step (1).

15. The process of claim 11 wherein the elevated pressure ranges from 25 to about 600 psig.

16. The process of claim 11 wherein the particulate material is metered through the mill and into the polymerization reactor using a rotary feeder operated at said elevated pressure.

17. The process of claim 11 wherein the particulate material is an inert particulate material is selected from the group consisting of carbon black, silica, clay, talc, calcium carbonate, activated carbon, modified carbon black, and mixtures thereof.

18. The process of claim 17 wherein the inert particulate material is selected from the group consisting of carbon black, silica, and mixtures thereof.

* * * * *